May 25, 1954
E. O. MARTINSON
2,679,322
ELEVATING CHARGER
Filed April 2, 1949
3 Sheets-Sheet 3
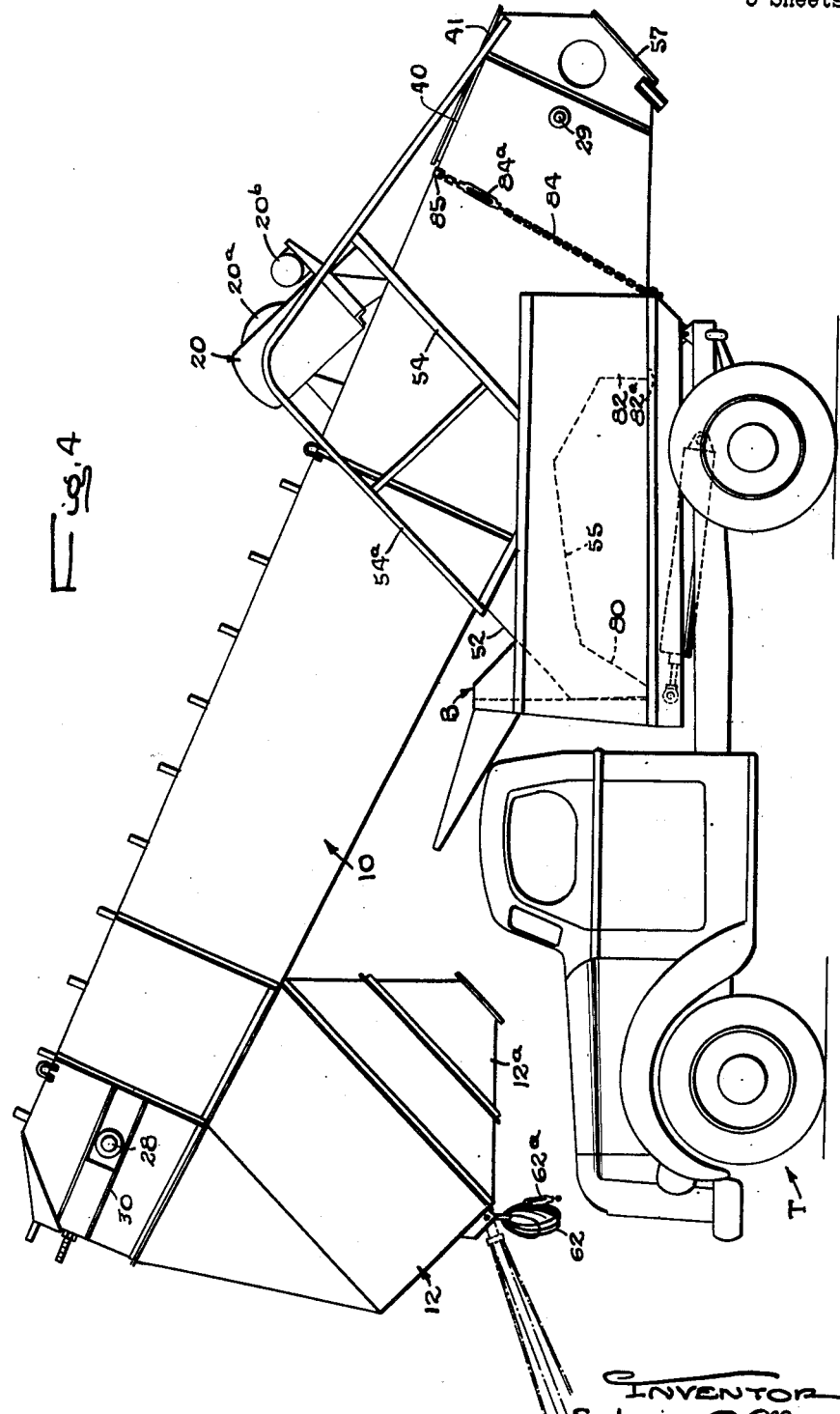
INVENTOR
Edwin O. Martinson
By Carlsen, Pitzner, Hubbard & Wolfe
ATTORNEYS Patented May 25, 1954

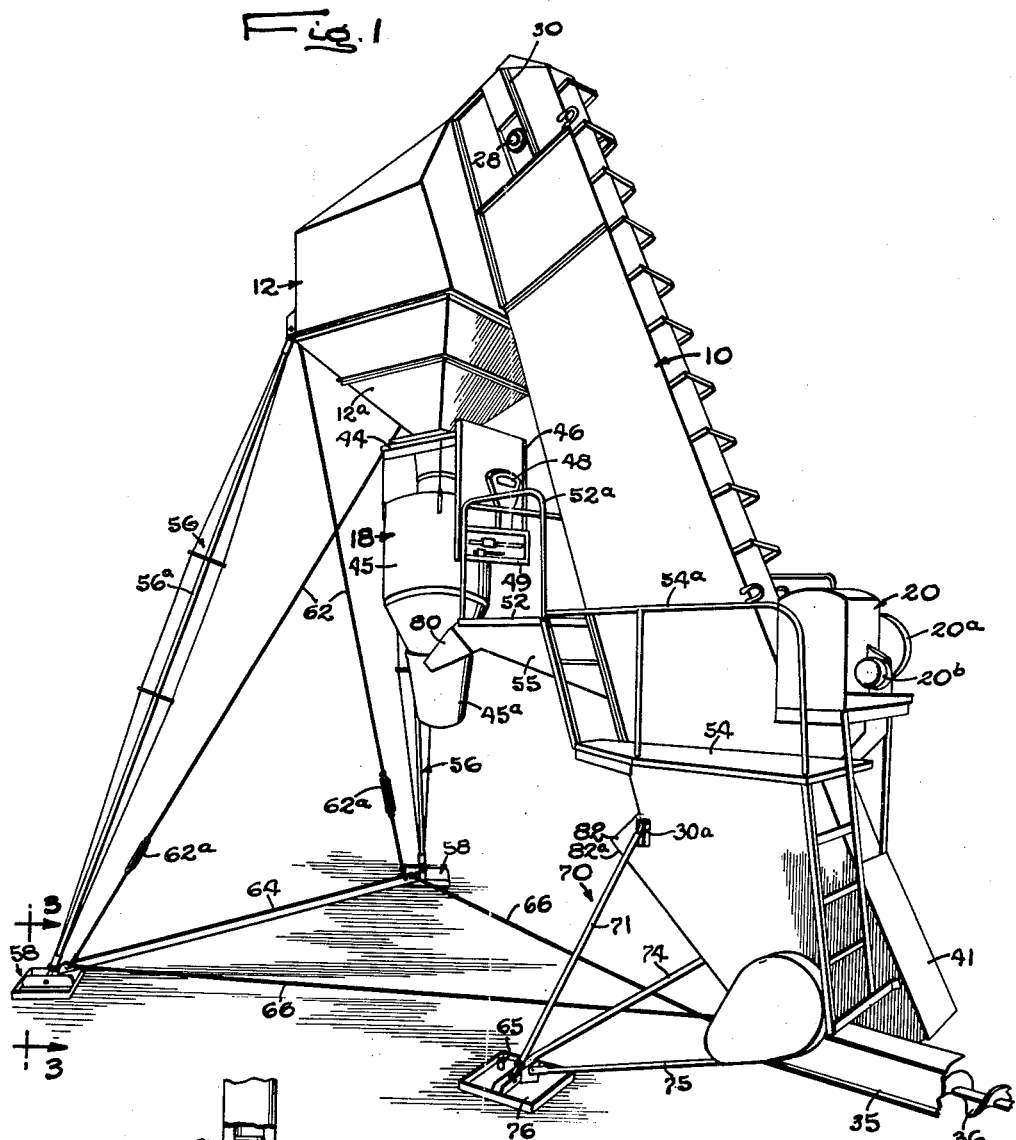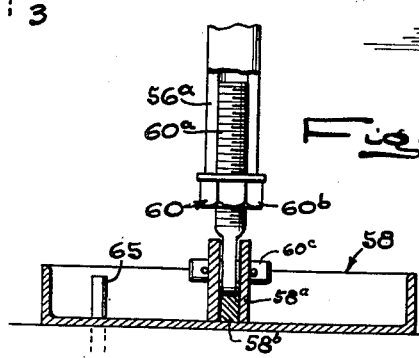

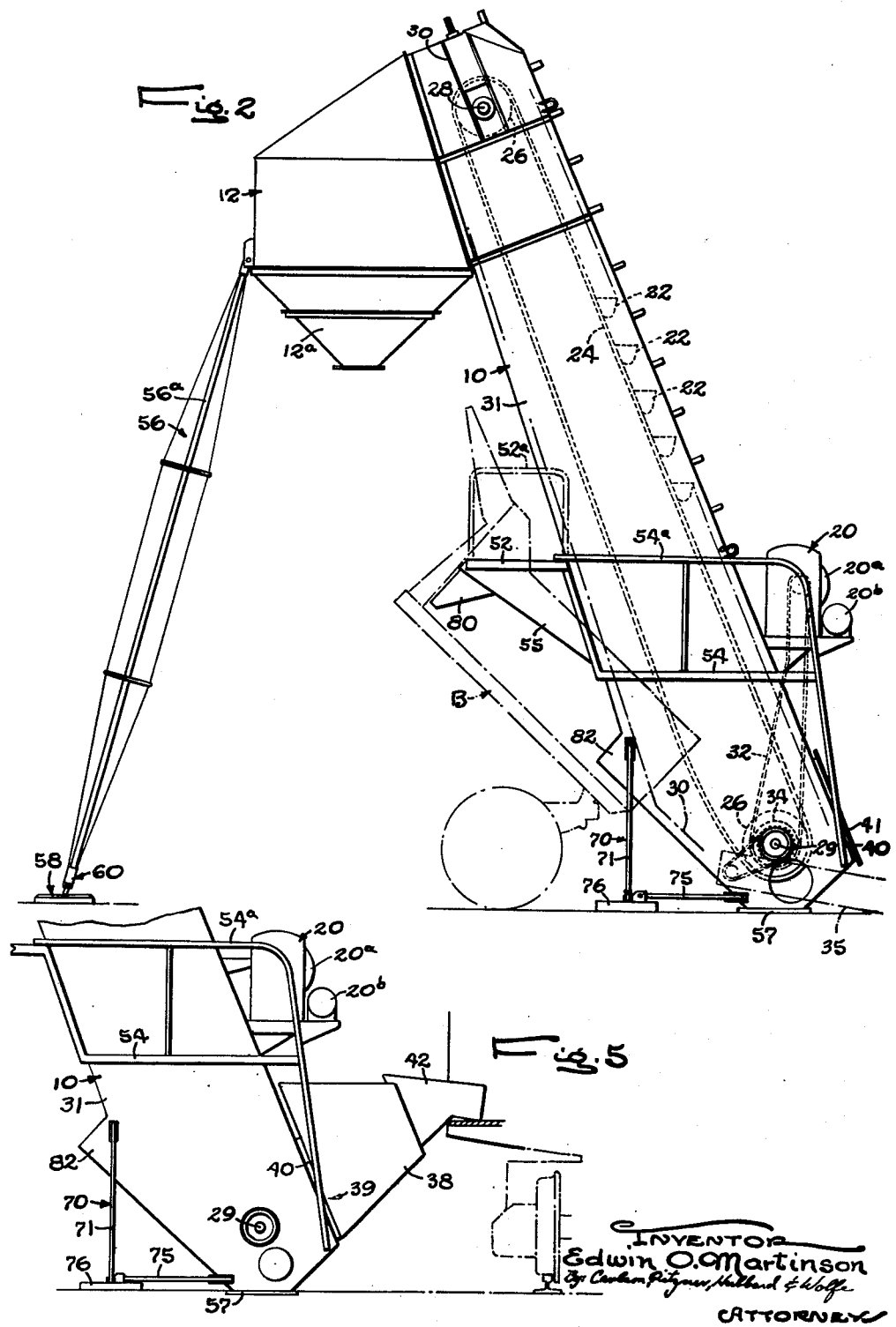

2,679,322

UNITED STATES PATENT OFFICE 2,679,322

ELEVATING CHARGER

Edwin O. Martinson, Milwaukee, Wis., assignor to The C. S. Johnson Company, Champaign, Ill., a corporation of Illinois Application April 2, 1949, Serial No. 85,093

6 Claims. (Cl. 214—2)

The present invention relates to bulk material handling apparatus, and has particular though by no means exclusive utility in the handling of cement.

In construction jobs it is normally most economical to have bulk materials, particularly cement, brought near the site of the work in railroad cars, the cars being placed on a siding for unloading. The cement is transferred from the cars into an elevated hopper or the like for subsequent delivery, preferably in measured quantities, to compartmented batch trucks for transportation to a mixer such, for example, as that of a road paver. In this general type of work material handling apparatus installations are best of a temporary character for when a job is completed the necessity therefor at a particular site is at an end, or as the job progresses it is desirable to change the car unloading location.

Accordingly, it is a general object of the present invention to provide an improved elevating charger which facilitates the unloading of bulk material from railroad cars and transferring of the same to trucks or the like for transportation to a mixer.

Another and more specific object is to provide an improved elevating charging apparatus which may itself be quickly and easily transported and erected, as well as dismantled and moved to suit the requirements of the particular job encountered, the novel construction and arrangement being such as to minimize disassembly operations and the necessity for auxiliary equipment, such as a crane or the like, to set up or take down the apparatus.

The objects of the invention thus generally set forth, together with other objects and ancillary advantages, are attained by the construction and arrangement shown by way of illustration in the accompanying drawings, in which:

Figure 1 is a perspective view of an elevating charger incorporating the features of the instant invention.

Fig. 2 is a side elevation, with some of the elements being indicated only in outline, and illustrating one stage in the setting up or taking down of the improved charger.

Fig. 3 is a fragmentary section taken substantially in the plane of line 3—3 in Fig. 1.

Fig. 4 is a side elevation of the charging apparatus in transport position.

Fig. 5 is a fragmentary side elevation of the lower portion of the apparatus and illustrating the arrangement of a boxcar unloading hopper.

While the invention is susceptible of various modifications and alternative constructions, there is shown in the drawings and will herein be described in detail the preferred embodiment, but it is not intended to limit the invention to the specific form disclosed; it is, however, intended to cover all modifications and alternative constructions falling within the spirit and scope of the invention as expressed in the appended claims.

In carrying out the invention, there is provided in a unitary structure, hereinafter referred to as a charger, all of the material handling instrumentalities for receiving the material upon its unloading from a railroad car, for elevating the received material and for temporarily storing it for subsequent transfer to a truck by means of which the material is to be delivered to a mixer. The structure is arranged for transportation, erection and taking down solely by the use of a single dump truck T of conventional form having the usual rearwardly tilting body B, thus eliminating the necessity for auxiliary handling equipment such as a crane or other hoisting device. Additionally, provision is made for the discharge of measured quantities of bulk material directly into delivery trucks.

Referring more particularly to the drawings, the improved charger there shown includes an inclined elevator 10 to the lower end of which material is delivered and which is operative to lift and discharge such material into a storage bin or hopper 12. The latter is adapted to hold several truckloads of material so the delivery of material is not delayed when it becomes necessary to clean out or to move the railroad cars. At the lower end of the elevator 10 is means for receiving bulk material directly from the railroad car and delivering it to the elevator as will hereinafter be more fully described. Supported on and beneath the hopper 12 is a weigh batcher 18 which receives material directly from the hopper and which is operative to supply a measured quantity thereof to a delivery truck driven into loading position beneath it. Adjacent the rear side of the elevator, intermediate its ends, is an engine 20 serving as a prime mover for the elevator and associated apparatus and which, as shown, is equipped with an air compressor 20a for aeration purposes and a generator 20b as a convenient source of electric power.

The elevator 10, in its preferred form, is of the bucket type including a series of scoop-like buckets 22 secured to an endless flexible chain 24 trained over sprocket wheels 26 carried by shafts 28 and 29 which are adjustably supported respectively at upper and lower ends of the elongated supporting frame 30. The elevator 10 is entirely surrounded by a dust housing 31 which is made drip tight to prevent entry of rain water, and is provided at its top with a suitable drip proof air venting to allow air escape as the hopper is being filled. In operation, the elevator is driven by means of a chain 32 trained over a sprocket wheel 34 on the shaft 29 and a companion drive sprocket wheel operatively associated with the shaft of the engine 20.

The means provided to supply material from the railroad car (not shown) to the elevator 10, as is shown in Figs. 1 and 2, comprises an underfeed conveyor mechanism 35 which is intended primarily for use in the unloading of hopper-bottom cars. By appropriate belt or chain drive, the conveyor mechanism is also driven from the engine 20. The outer or intake end of the conveyor is inserted between track crossties under the hopper gate on the bottom of the car. A helical screw 36 within its outer casing withdraws the material and discharges it into the bottom of the elevator housing 31 at the foot of the elevator 10 so that it can be picked up by the buckets 22 of the elevator and carried upwardly for discharge at the top of the elevator into the hopper 12.

For receiving material unloaded from a boxcar and supplying it to the elevator, different means is employed. As shown in Fig. 5, this includes a funnel-like hopper 38 of generally triangular cross section having a discharge opening 39 in its rear wall. The discharge opening 39 is adapted to fit over a flanged opening 40 in the elevator dust cover 31 at the lower end thereof. When the feed screw conveyor 35 is used, the opening 40 is closed by a cover 41 (Fig. 1). An auxiliary extension member 42 is provided to guide the material between the car and the hopper 38. The member 42 is slidably received between the side and front walls of the hopper 38 to permit accommodation of boxcars having different floor heights.

The hopper 12 is preferably constructed of sheet metal and has the walls of its bottom portion 12a inclined toward an apex with a discharge opening therein which is controlled by a suitable discharge control gate (not shown). Disposed about the discharge opening at the apex of the hopper bottom 12a is a frame 44 for the support of the weigh batcher 18.

The weigh batcher 18 may be of conventional form and includes a hopper 45, a scale frame 46, together with suitable scale beams and an indicating device 48 supported on a beam box 49. The lower end of the weigh batcher hopper 45 is funnel-shaped and includes suitable discharge gates. To minimize blowing of cement dust, the lower end of the hopper 45 is, in the present instance, provided with a cloth funnel 45a. It will be apparent from an inspection of the drawings that the lower end of the hopper 45 is spaced above the ground a sufficient distance to permit a conventional dump truck to be driven thereunder, thus permitting the contents of the weigh batcher 18 to be directly discharged by gravity flow into the truck without necessitating further handling.

To accommodate an operator, the instant device is provided with platforms 52 and 54, the former being disposed so that the operator standing thereon can control the batching of materials and the discharge of the same into a waiting truck. The latter platform 54 is used both as an access to the platform 52 and to provide a support upon which the operator can stand to attend the engine 20. The platform 52 is supported on a pair of outwardly diverging brackets 55, the inner ends of which are rigid with the elevator frame 30. For purposes of safety, the platforms are provided with handrailings 52a and 54a, respectively, which are removably received in suitable sockets provided therefor adjacent the outer edges of the platforms.

Referring particularly to Fig. 1 of the drawings, it will be seen that the means for maintaining the charger in erected condition includes a pair of downwardly extending and outwardly diverging supporting members or outriggers 56, a floor plate 57 rigid with the bottom of the elevator 10, together with suitable cross bracing and interconnecting members. Each of the outriggers 56 includes a suitably braced central tubular element 56a detachably connected at its upper end at one of the outer corners of the hopper 12. The lower ends of the members 56 rest on foot pads 58 placed directly on the ground. To permit adjustment of the length of each of the members 56 for leveling purposes, an adjusting screw and nut arrangement 60 is provided. As best seen in Fig. 3, this arrangement includes a screw 60a, one end of which is pivotally connected to the foot pad 58 while the other end is telescopingly received in the end of the tubular element 56a. A nut 60b serves as a limiting abutment engageable with the end of the tubular element 56a and is adjustably positioned on the screw 60a. To provide for minor variations in alinement caused by ground unevenness and settling during operation of the charger, some play is allowed in the pivotal connection between the lower end of the screw 60a and the foot pad 58. To this end, the connection is formed by a pin 60c loosely received in holes provided therefor in upright bracket plates 58a rigid with the foot pad 58 and adjacent the end of the screw 60a. Interposed between the brackets 58a is a member 58b providing an arcuate seat on which the lower end of the screw 60a bears. Diagonal wind brace guys 62 are used to provide adequate cross bracing and each includes a turnbuckle 62a to permit tension adjustment.

To eliminate the danger of the lower ends of the outrigger struts 56 and the foot pads 58 moving laterally outward, a cross brace 64, which may conveniently be in the form of ordinary angle stock, is provided, the ends of which are detachably connected to the foot pads 58. If the charger is erected directly on the ground, steel stakes 65 may be driven through apertures provided therefor in each of the foot pads 58.

To prevent forward movement of the lower ends of the outriggers 56, horizontally disposed cables 66, lying directly on the ground, are provided between the lower ends of the outriggers and the bottom of the elevator 10. It will be appreciated that with the charger erected directly on the ground and steel stakes used, the cables 66 serve merely as additional insurance against such forward movement. However, should the charger be erected on concrete, as for example on an apron adjacent a railroad siding, the cables 66 should be used since the use of anchoring means in the form of stakes is impractical.

Additional lateral support for the charger is provided by an arrangement of outrigger struts 70 adjacent the lower end of the elevator 10. These include an angularly disposed strut 71 on each side of the elevator, detachably connected at its inner end to a bracket 30a rigid with the elevator frame 30. At its outer end the strut 71 may, if desired, be provided with a length adjusting nut-and-screw arrangement similar to that shown in Fig. 3 and already described. Additionally, this lateral support arrangement as shown includes a pair of horizontal strut elements 74 and 75, the former extending transversely beneath the elevator 10 between the lower ends of the struts 71, and the latter being secured at their rear ends to the base of the elevator adjacent the floor plate 57, and being secured at their forward ends adjacent the lower ends of the struts 71. The outer ends of each of the strut elements 71, 74 and 75 are supported on rear foot pads 76.

In practicing the present invention, means are provided for securely nesting the charger in an upraised truck body while it is in its ground supported condition so that upon removal of the ground supports the charger becomes completely truck-supported, requiring merely the lowering of the truck body to place it in a stable transport position. Erection may be effected simply by reversing this procedure. In the present instance, the charger is supported in a truck by pedestals spaced to engage the front and rear ends, respectively, of the truck body. The first pedestal has two portions 80 (only the near one being shown) which are mounted on the supporting brackets 55 and adapted for nesting in the forward corners of the truck body. These are preferably fashioned from steel plate stock and include front and side plates disposed substantially at right angles to each other. The rear pedestal is preferably formed of a single piece of steel plate bent to form a hollow member 82 of triangular cross section extending transversely across the elevator frame 30. The downwardly facing surface 82a of the pedestal 82 is sufficiently long to accommodate slight differences in the length of the truck body which may be employed for transport. As shown, the inclined surface 82a and the outer ends of the pedestal portions 80 are arranged in a common plane which is disposed to correspond to that of the floor of the truck body B when in substantially fully raised position.

To hold the charger in the truck body B, a pair of traveling guys or ties 84 are provided, one on each side of the charger. These are in the form of chains equipped with turnbuckles 84a and are adapted to extend between the outer rear corners of the truck body B and eyebolts 85, or the like, rigid with the rear side of the charger frame 30 near the lower end thereof.

When it is desired to dismantle the charger and move it to another location, the beam box 49 is first disconnected, and then the scale frame 44 and the weigh batcher 18 are removed. They may, if desired, be simply lowered into a truck driven into regular loading position by means of a chain or rope falls secured to the hopper 12. The upper operator's platform railing 52a is then removed and at the same time the screw conveyor 35 or boxcar unloading hopper 38, depending on which was used, is also removed, as are the forward, diagonal, wind brace guys 62 and the cross brace 64 between the outriggers 56.

With the charger in this partially dismantled condition, the dump truck T is then backed in line with the charger between the two outriggers 56 and its body B is hoisted, as indicated in Fig. 2, until the floor thereof engages the pedestals 80 and 82. The traveling ties 84 at the lower end of the charger are then attached to the rear corners of the truck floor, thus securing the charger to the truck body B.

A slight additional raising of the truck body B removes the weight from the rear outrigger strut arrangement 70 so that the rear foot pads 76 and the struts 71, 74 and 75 can be removed. Such raising also relieves the front outriggers 56 of the weight of the charger, permitting removal of the foot pads 58. With this done, the lower ends of the outriggers 56 can be swung outwardly from the ground and the truck body lowered completely. The upper ends of the outriggers 56 are then disconnected from the charger hopper 12. Upon final tightening the turn-buckles 84a of the ties 84, the charger is in condition for transportation to the next site.

It will be noted especially that the construction and arrangement described requires only a minimum of dismantling. Aside from the weigh batcher, the feeding means for the elevator and the elements of the ground supporting means, none of the other components of the charger required attention. Further, no lifting device other than the dump truck T in which the charger is to be transported is required.

The length of the brackets 55 and the pedestals 80 maintains the charger in forwardly and upwardly inclined position so as to clear the cab of the truck. The tapered form of the hopper bottom, together with the upward inclination of the charger, permits a clear line of vision for the driver of the truck when the charger is in transport position, as will be noted upon inspection of Fig. 4 of the drawings.

Still other advantages flow from the construction and arrangement of an elevating charger as hereinbefore set forth. In addition to leaving a clear line of vision for truck driver, it will be noted that there are no components of the charger overhanging the sides of the truck, forward and rear overhang is minimized, and there are no ground engaging wheels to be trailed behind the truck. Thus, there is no sacrifice of maneuverability of the truck, and the charger can be speedily and safely transported from one site to another on regular highways without interruption of normal traffic flow.

While the center of gravity of the instant device has not been discussed in detail, it is preferably located rearwardly of the pedestal portions 80 and forwardly of the pedestal 82. With the center of gravity so located, any tendency for the device to rock forwardly or rearwardly and strain on the traveling ties 84 is minimized, and such relative low location results in a stable truck loading.

Upon reaching a new site, the charger can be similarly erected without the use of a crane or the like. When the site has been selected, the truck T is backed at right angles to the railroad siding on which the cars of material are to be placed for unloading. The truck body B is then raised until the floor plate 57, rigid with the bottom of the elevator 10, rests on the ground, the truck body being raised so that the operating platforms 52 and 54 are approximately level. The forward support members or outriggers 56 are attached to the hopper 12 and the two wind brace guys 62 are uncoiled. The front foot pads 58 are laid down with the spacer cross brace 64 temporarily installed between them, and the adjusting screws 60a are inserted in the ends of the outriggers 56. By adjusting the nuts 60b on the screws 60a, leveling of the charger may be obtained. The rear foot pads 76 are placed in position and the struts 71, 74 and 75 are attached to the lower end of the charger. After this latter operation has been accomplished, the rear adjusting screws are tightened, and the transport ties may be disconnected and the truck T moved forwardly between the front outriggers 56. As soon as the truck is driven away, the front cross brace 64 may be finally installed and the diagonal cable wind braces 62 secured in place.

The screw conveyor or boxcar unloading hopper can then be attached and the cement weigh batcher 18 installed. The only thing remaining is to install the operator platform hand railings 52a and 54a, and when this is done, the charger is again ready for operation.

I claim as my invention:

1. For use with a conventional dump truck having a rearwardly tilting body, an elevating charger comprising, in combination, an elevator, means for receiving bulk material unloaded from a railroad car or the like and delivering the same to the elevator, a hopper rigid with the upper end of the elevator for receiving material therefrom and adapted to discharge its contents by gravity directly into a truck placed therebeneath, a first support means for maintaining the charger in erected condition, and a second support means for the charger adapted to cooperate with said truck body to carry the weight of the charger upon removal of said first support means and permit the same to be erected, taken down and transported solely by means of said truck, said second support means including a pair of brackets rigid with said elevator forwardly of its center of gravity, pedestals rigid with the outer ends of said brackets for reception in the forward end of said truck body, a third pedestal rigid with said elevator rearwardly of the center of gravity of the charger for engagement with the truck body adjacent the rear end thereof.

2. For use with a conventional dump truck having a rearwardly tilting body, an elevating charger comprising, in combination, an elevator, means for receiving bulk material unloaded from a railroad car or the like and delivering the same to the elevator, a hopper rigid with the upper end of the elevator for receiving material therefrom and adapted to discharge its contents by gravity directly into a truck placed therebeneath, a first support means for maintaining the charger in erected condition, and a second support means for the charger adapted to cooperate with said truck body to carry the weight of the charger upon removal of said first support means and permit the same to be erected, taken down and transported solely by means of said truck, said second support means including a pair of brackets rigid with said elevator forwardly of the center of gravity of the charger, pedestals rigid with the outer end of said brackets for reception in the forward end of said truck, a third pedestal rigid with said elevator rearwardly of the center of gravity of the charger for engagement with the truck body adjacent the rear end thereof, and tie means carried by said elevator in the region of the third pedestal and adapted to be connected adjacent the outer rear corners of the truck body.

3. For use with a dump truck of the type having a rearwardly tilting body, an elevating charger comprising, in combination, an elevator, a hopper rigid with the upper end of said elevator for receiving material therefrom, a first supporting structure for maintaining the charger in erected position, and a second supporting structure for cooperation with said truck body upon disabling said first structure, whereby the charger can be erected, taken down and transported solely by said truck, said second supporting structure including means rigid with said elevator forwardly of the center of gravity of the charger for engagement in the front of the truck body and means rearwardly of the center of gravity of the charger for engagement in the rear of the truck body.

4. For use with a dump truck of the type having a rearwardly tilting body, an elevating charger comprising, in combination, an elevator, a hopper rigid with the upper end of said elevator for receiving material therefrom, a first supporting structure for maintaining the charger in erected position, and a second supporting structure for cooperation with the truck body upon disabling said first structure, whereby the charger can be erected, taken down and transported solely by said truck, said second structure including forward and rear members for reception in the truck body, the former being of substantially greater length than the latter for supporting the charger on said truck body in a forwardly inclined position when the body is lowered for transport so that the upper portion of said elevator clears the cab of the truck with the hopper disposed in overlying relation to the truck engine hood and spaced above the same to leave a clear line of vision for the operator.

5. For use with a dump truck of the type having a rearwardly tilting body, an elevating charger comprising, in combination, an elevator, a hopper rigid with the upper end of said elevator for receiving material therefrom, a first supporting structure for maintaining the charger in erected position, and a second supporting structure for cooperation with said truck body upon disabling said first structure, whereby the charger can be erected, taken down and transported solely by said truck, said second supporting structure including a pair of outwardly diverging brackets rigid with said elevator above the center of gravity of the charger, a pedestal member rigid with the outer end of each of said brackets for reception in the forward outer corners of said truck body, said brackets and pedestal members being of a length and disposed to maintain said charger in a position wherein said elevator clears the cab of the truck when the body is in lowered transport position.

6. For use with a conventional dump truck having a rearwardly tilting body, an elevating charger comprising, in combination, an elevator, means for receiving bulk material directly from a railway car or the like and feeding the same to said elevator, a storage bin rigid with the upper end of the elevator for receiving material therefrom, a pair of supporting members detachably connected to said hopper and operative to prevent forward tipping of the charger, a weigh batcher removably supported beneath said bin for receiving and batching material from the bin and disposed for discharge of its contents by gravity into the truck, an engine mounted on said elevator and supplying all power for operating the charger, operating platforms permitting attendance to said weigh batcher and said engine, brackets rigid with said elevator for supporting said platforms, and pedestal members rigid with said brackets, said pedestal members being adapted to engage the front of the truck body whereby upon removal of said batcher and support members the charger can be taken down for transport solely by said truck.

References Cited in the file of this patent

UNITED STATES PATENTS

| Number | Name | Date |
| --- | --- | --- |
| 734,292 | Barnes | July 21, 1903 |
| 1,732,487 | Seefeld | Oct. 22, 1929 |
| 2,078,379 | Grayson et al. | Apr. 27, 1937 |
| 2,233,005 | Garlinghouse | Feb. 25, 1941 |
| 2,310,592 | Noble | Feb. 9, 1943 |
| 2,347,437 | Saxe | Apr. 25, 1944 |
| 2,397,420 | Jorgensen | Mar. 26, 1946 |